United States Patent [19]
Johnson et al.

[11] Patent Number: 5,828,489
[45] Date of Patent: Oct. 27, 1998

[54] NARROW WAVELENGTH POLARIZING BEAMSPLITTER

[75] Inventors: Walter E. Johnson, Dayton, Ohio; William H. Southwell, Thousand Oaks; Randolph L. Hall, Newbury Park, both of Calif.

[73] Assignee: Rockwell International Corporation, Costa Mesa, Calif.

[21] Appl. No.: 631,509

[22] Filed: Apr. 12, 1996

[51] Int. Cl.$^6$ .............................. G02B 5/30; G02B 27/28; G02B 1/10

[52] U.S. Cl. .......................... 359/487; 359/495; 359/498; 359/583

[58] Field of Search ...................................... 359/487, 495, 359/498, 583

[56] References Cited

U.S. PATENT DOCUMENTS

| | | | |
|---|---|---|---|
| 2,403,731 | 7/1946 | MacNeille | 88/65 |
| 3,704,934 | 12/1972 | Holmes et al. | 359/487 |
| 4,583,822 | 4/1986 | Southwell | 359/586 |
| 4,826,267 | 5/1989 | Hall et al. | 359/586 |
| 4,952,025 | 8/1990 | Gunning, III | 359/586 |
| 5,004,308 | 4/1991 | Hall et al. | 359/884 |
| 5,181,143 | 1/1993 | Southwell | 359/586 |
| 5,339,441 | 8/1994 | Kardos et al. | 359/352 |
| 5,347,644 | 9/1994 | Sedlmayr | 359/465 |
| 5,579,159 | 11/1996 | Ito | 359/487 |

OTHER PUBLICATIONS

Banning, "Practical Methods of Making and Using Multilyaer Filters," *Journal of the Optical Society of America*, vol. 37, No. 10, pp. 792–797 (Oct. 1947).

Johnson et al., "Introduction to Rugate Filter Technology," SPIE, vol. 2046, pp. 88–108 (1993).

*Primary Examiner*—Ricky D. Shafer
*Assistant Examiner*—Mark A. Robinson

[57] ABSTRACT

A polarizing beamsplitter includes a gradient index film, such as a rugate filter, embedded in an optical medium. The rugate filter is comprises a thin film having a sinusoidal variation in refractive index through its thickness. The embedding medium may include a pair of prisms with the rugate filter between joining faces of the prisms. The rugate filter is embedded so that an incident beam in the embedding medium forms an angle with respect to a normal from the plane of the rugate filter. Embedded at a non-orthogonal angle, the rugate filter is highly transmissive for both the p- and s-polarized broadband components of the incident beam. The beamsplitter is highly reflective, however, at an s-polarization narrow wavelength reflection band determined by the refractive index variations of the rugate filter. Polarizing beamsplitters may be fabricated with multiple reflection bands, including reflection bands in spectral regions other than the visible spectrum. The polarizing beamsplitter can function as a polarizer, a beamsplitter, or a polarizing beamsplitter. An advantage of the invention is efficient reflection of s-polarized light at specific narrow wavelengths with high transmission of s-polarizations at all other wavelengths and p-polarizations at all wavelengths.

7 Claims, 7 Drawing Sheets

NARROW WAVELENGTH POLARIZING BEAMSPLITTER

GOVERNMENT RIGHTS

The United States Government has rights in this invention under Contract Number F33615-91C-5550 awarded by the Department of the Air Force.

TECHNICAL FIELD

The present invention relates to optical interference coatings and, in particular, to a polarizing beamsplitter comprising a gradient index film placed at a non-orthogonal angle with respect to an incident beam for transmitting broadband light and reflecting polarized narrow wavelengths.

BACKGROUND OF THE INVENTION

A known class of polarizing optical elements operates on the principle of selective absorption, as exemplified by a sheet of polarizing material that comprises a large flat dichroic crystal or by the molecular analog of a wire grid polarizer. Another class of polarizers, as exemplified by a Nicol prism, utilizes a birefringent material formed as a prism. A polarizing optical element commonly referred to as a MacNeille polarizer (U.S. Pat. No. 2,403,731) comprises two right angle prisms, one of which includes a multilayer dielectric coating on its hypotenuse face. The hypotenuse faces of the two prisms are bonded together with an optical quality cement to form a cube. As is well known in the field of optics, the plane of incidence of a light ray incident on a surface is defined by the direction of ray propagation and the normal to the surface (i.e., the plane of incidence contains both of these vectors). The p-polarization of a light ray comprises the electromagnetic component vibrating in the plane of incidence and the s-polarization comprises the component vibrating in a plane perpendicular to the plane of incidence. In a MacNeille polarizer, an angle of incidence is found which satisfies the Brewster condition for materials with differing refractive indices. At this angle of incidence, a MacNeille polarizer suppresses the p-polarization reflectance but not the s-polarization reflectance. As a result, a MacNeille polarizer divides incident unpolarized or natural light into two polarized beams traveling in orthogonal directions: p-polarized light is transmitted through the polarizer while s-polarized light is reflected by the multilayer dielectric coating. The MacNeille polarizer was designed for polarizing and splitting beams of light over a broad band of the visible spectrum (approximately 0.4 to 0.7 microns), and has been widely used in optical range finders. Prior art polarizing beamsplitters, such as the MacNeille polarizer, are generally designed for operation in broad ranges of wavelengths. Such beamsplitters, however, result in a loss of throughput when it is necessary to transmit broad spectral signals while reflecting light in narrow wavelength bands. Because of the widespread use of many different types of lasers that emit high radiant power over a very narrow spectral linewidth (such as ruby lasers having a linewidth of approximately 0.1 angstrom), there is a need for a polarizing beamsplitter that functions in one or more narrow wavelength s-polarization reflection bands, typically corresponding to laser spectral lines.

SUMMARY OF THE INVENTION

The present invention comprises a polarizing beamsplitter in which the multilayer dielectric coating of the prior art MacNeille polarizer is replaced with a thin film having a refractive index gradient through its thickness. In a preferred embodiment, the gradient index film comprises a rugate filter that is embedded in a supporting optical medium, such as between a pair of joined prisms, for example. The rugate filter is embedded so that an incident light beam in the embedding medium forms an angle $\theta_i$ with respect to a normal from the interface plane of the rugate filter. Embedded at a non-orthogonal angle, the rugate filter is highly transmissive for both the p- and s-polarized broadband components of the incident light. The beamsplitter is highly reflective, however, at s-polarized narrow wavelength reflection band(s), which are determined by the refractive index variations of the rugate filter. Polarizing beamsplitters of the present invention may be fabricated with multiple reflection bands (limited only by the upper and lower refractive indices of the materials used to form the rugate filter) and with reflection band(s) in other spectral regions besides the visible spectrum. The polarizing beamsplitter can function as a polarizer, a beamsplitter, or a polarizing beamsplitter. The polarizing function converts unpolarized or natural light into polarized light. The beamsplitting function separates a beam of incident light into two beams traveling in different directions. The polarizing beamsplitter function separates a beam of incident light into two beams having different polarizations and directions.

A principal object of the invention is to reflect polarized light in narrow spectral regions while transmitting broadband light. A feature of the invention is a gradient index film, such as a rugate filter, placed at a non-orthogonal angle in an embedding medium. An advantage of the invention is efficient transmission of p-polarizations at all wavelengths and reflection of s-polarizations at specific narrow wavelengths with high transmission of s-polarizations at all other wavelengths.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises a polarizing beamsplitter that can function as a polarizer, a beamsplitter, or a polarizing beamsplitter. The polarizing function converts unpolarized or natural light into polarized light. The beamsplitting function separates a beam of incident light into two beams traveling different directions. The polarizing beamsplitting function separates a beam of incident light into two beams having different polarizations and directions.

In the polarizing beamsplitter of the present invention, the multilayer dielectric coating of the prior art MacNeille polarizer is replaced with a thin film having a variation in refractive index (i.e., a gradient index) through its thickness. In a preferred embodiment, the gradient index film comprises a rugate filter. The refractive index n(x) for a single sine wave rugate filter is given by:

$$n(x) = n_a + \frac{n_{pv}}{2} \sin\left(\frac{4\pi x}{\lambda_r} + \phi\right), \text{ where}$$

$n_a$=average refractive index;
$n_{pv}$=peak-to-valley refractive index excursion;
$\lambda_r$=center wavelength of the reflection band; and
$\phi$=sine wave phase at the substrate.

The wavelength, $\lambda_r$, which spectrally locates the center of the reflection band at a normal angle of incidence, is given by:

$\lambda_r = 2 n_a P$, where P is the period of a single cycle in optical thickness of the sine wave refractive index profile. At non-normal angles of incidence, the spectral position of the reflection band shifts to lower wavelengths, as approximated by the equation:

$$\frac{\Delta\lambda}{\lambda_r} = \frac{\sin^2\theta_i}{2n_a^2},$$

where θ is the angle of incidence of the beam in the incident medium. A more precise determination of $\lambda_r$ for a given desired reflection band can be calculated by using standard matrix methods for evaluating s- and p- polarization reflectances (see, for example, H. A. Macleod, *Thin Film Optical Filters*, Second Edition, Macmillan, New York, 1986). In this calculation, the rugate filter is represented as a large number of thin film layers, with each layer having a uniform refractive index. Rugate filters can be spectrally tailored by superimposing additional sinusoidal variations in the refractive index profile of the film. This results in a selective number of multiple s-polarization reflection bands, center wavelengths, bandwidths, and optical densities.

Figure 3:
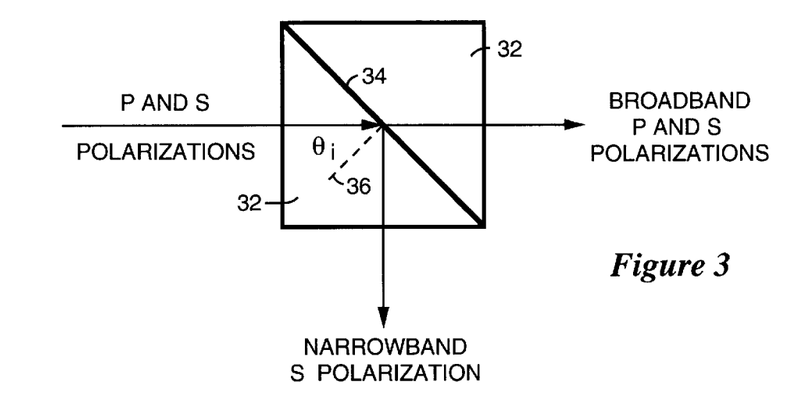
FIG. 3 is a top plan view of two right angle prisms joined with an embedded rugate filter between the hypotenuse faces.

In the polarizing beamsplitter of the present invention, as best illustrated in FIG. 3, a thin film 34 having a refractive index gradient (such as a rugate filter, for example) is embedded in a supporting optical medium 32, such as a pair of joined prisms. Rugate filter 34 is embedded so that an incident light beam in the embedding medium forms an angle $\theta_i$ with respect to a normal 36 from the interface plane of the rugate filter. Embedded at a non-orthogonal angle, the rugate filter is highly transmissive for both the p- and s-polarized components of the incident light, except at highly reflective narrow wavelength s-polarization reflection band(s) that are determined by the refractive index variations of the rugate filter. Although the invention was developed using a single narrow wavelength s-polarization reflection band located in the visible spectrum, other spectral regions, such as the infrared, are also possible when using the appropriate materials. Rugate filters for the visible/near infrared spectral region have been fabricated of the following materials: $SiO_2/TiO_2$, $SiO_x$, and $SiO_xNi_y$. Rugate filters for infrared applications have been fabricated of the following materials: Ge/Si, ZnS/ZnSe, Ge/ZnS and $Al_{1-x}Ga_xAs$ (where $0 \leq x \leq 1$). In addition, the fabrication of polarizing beamsplitters having multiple reflection bands is limited only by the upper and lower refractive indices of the rugate filter materials.

For efficiency, the optical materials used to fabricate the polarizing beamsplitter should exhibit low absorption within the passband of the beamsplitter. Also, an optical quality cement should be selected to minimize the refractive index discontinuity between the rugate filter and embedding material. Although these are important considerations, they are well known to those skilled in the art and are adequately addressed by known optical materials technology. In addition, anti-reflection coatings can be deposited on the appropriate external faces of the polarizing beamsplitter to reduce the refractive index discontinuity between the optical material and the surrounding medium from which light enters and exits. This discontinuity in the refractive index can produce a Fresnel reflection that results in a loss in light. For purposes of describing the present invention, all performance spectra illustrate internal transmittances, which exclude Fresnel reflections at the external faces of the polarizing beamsplitter. Also, prisms of fused silica having a refractive index of 1.46 are described as an example (not a limitation ) of the medium for embedding the rugate filter. Other optical quality materials suitable for embedding a rugate filter are well known and commercially available.

Figure 1:
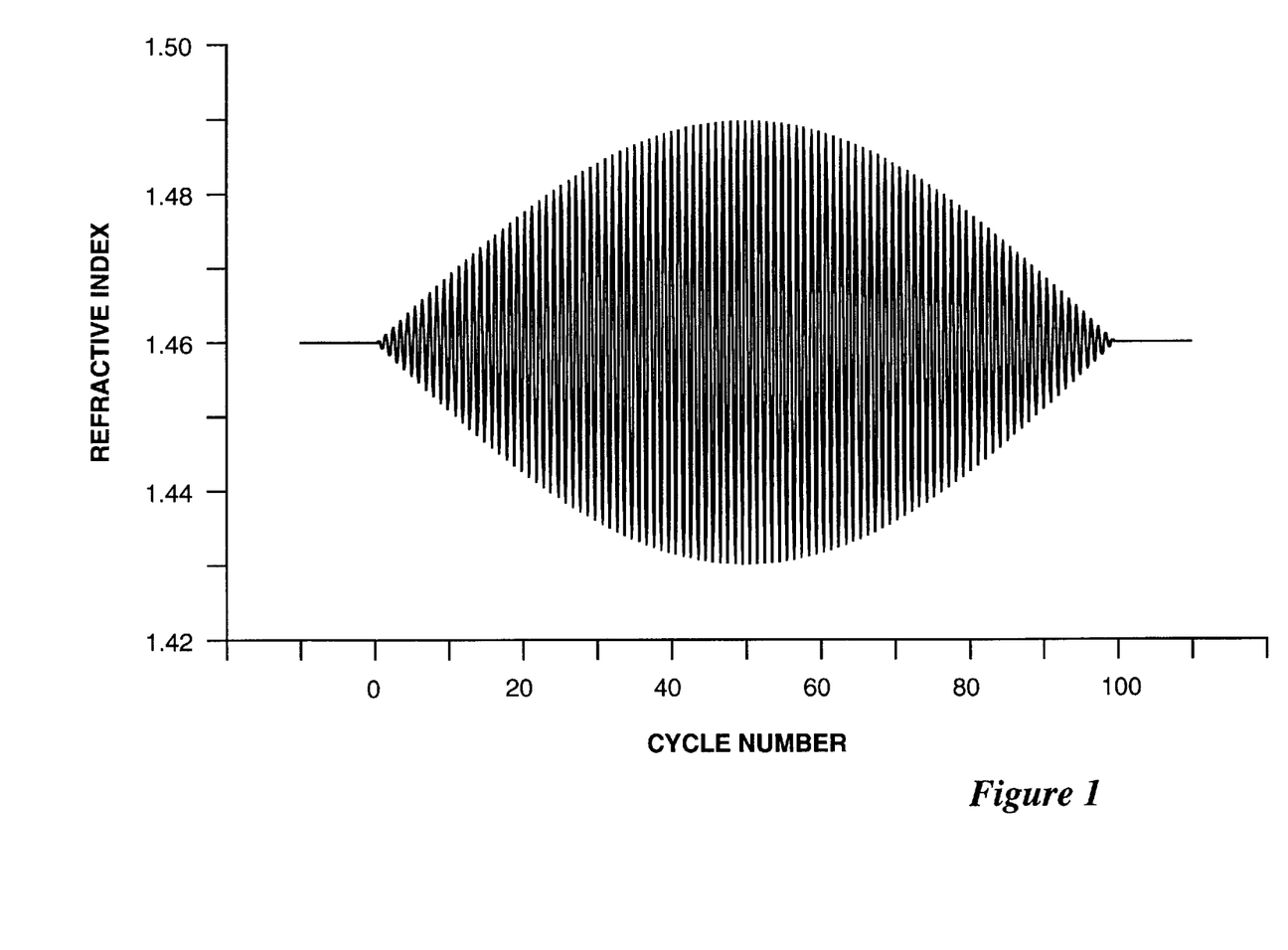
FIG. 1 is a graph of refractive index versus thickness (i.e., a refractive index profile) of a rugate filter having an average refractive index (1.46) equal to that of the media (e.g., fused silica prisms) in which it is embedded.

In one embodiment of the present invention, the average refractive index of the rugate filter is designed to equal the refractive index of the embedding medium. The design of this rugate filter, as illustrated in FIG. 1, is convenient when the materials used to fabricate the rugate filter allow refractive index excursions that are both higher and lower than the refractive index of the embedding medium. The rugate filter illustrated in FIG. 1 has 100.5 sinusoidally varying cycles with a maximum peak-to-valley refractive index excursion of 0.06 around the refractive index of the fused silica embedding medium (1.46). The entire refractive index profile of the rugate filter is also apodized by a half cycle sine-wave enveloping function to enhance the internal transmittance of the resulting optic.

The optimal angle for incident light, as defined from a normal to the interface of the rugate filter with the embedding medium, is determined by finding the incidence angle ($\theta_i$) which satisfies the Brewster condition described by the equation:

$$\tan\theta_i = \frac{n_t}{n_i}, \text{ where}$$

$n_i$ and $n_t$ are the refractive indices of the incident medium and the transmitted medium, respectively. With respect to the present invention, the incident medium is the embedding medium (e.g., fused silica prism) and the transmitted medium is the rugate filter. In the exemplary embodiment of the polarizing beamsplitter where the average refractive index of the rugate filter equals the refractive index of the embedding medium (as illustrated in FIG. 1), the Brewster condition indicates that the light within the beamsplitter should travel at an incidence angle of 45° with respect to a normal with the rugate interface.

A polarizing beamsplitter with a rugate filter at a 45° angle ($\theta_i$) can take the shape of a cube, as illustrated in the top plan view of FIG. 3. This embodiment can be formed of two right angle prisms with the rugate filter between the joined hypotenuse faces. This polarizing beamsplitter is highly transmissive for both p- and s-polarized light except at the highly reflective narrow wavelength s-polarization reflection band(s). The p-polarized light is simply transmitted by the optic while the s-polarized light is redirected by reflection. In this embodiment the two beams of light exiting the polarizing beamsplitter are orthogonal to one another.

Figure 2:
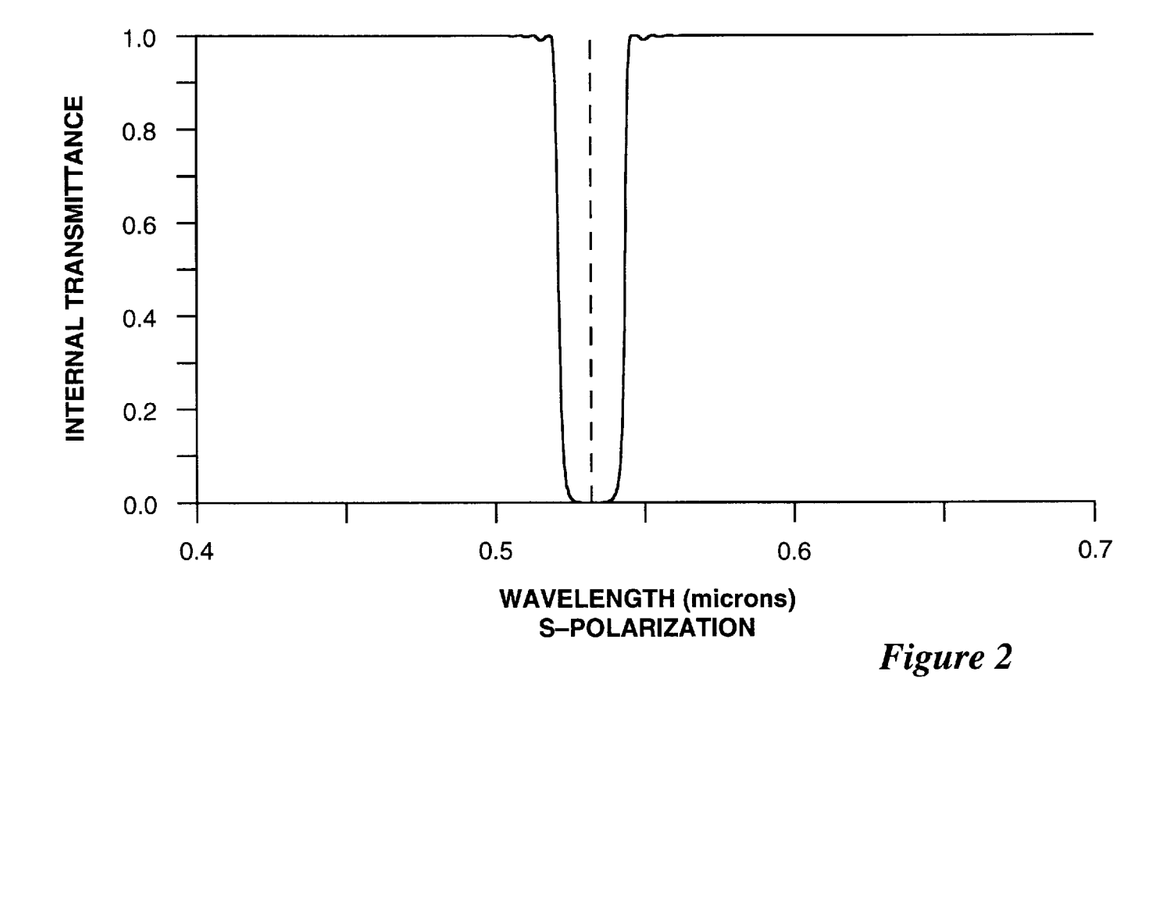
FIG. 2 is a graph of the s-polarization internal transmittance of a polarizing beamsplitter having an embedded rugate filter with the refractive index profile illustrated in FIG. 1.

The foregoing embodiment is designed to produce a highly transmitting polarizing beamsplitter having a single s-polarization reflection band at a wavelength of 0.532 microns, which is the second harmonic of the 1.064 micron Neodymium:YAG laser. The s-polarization transmittance of this polarizing beamsplitter is illustrated in FIG. 2. The dashed vertical line in FIG. 2 indicates the laser wavelength at 0.532 microns. This reflection band has a full-width-half-maximum bandwidth of approximately 3.1 percent. FIG. 2 shows that the beamsplitter's internal transmittance of s-polarized light is very high over the remainder of the visible spectrum. The internal transmittance from 0.4 to 0.7 microns is greater than 0.99 except for a small part of the sidelobe adjacent to the s-polarization reflection band (on the short wavelength side). The internal transmittance for p-polarized light (not illustrated) is also extremely high, with only a single narrow dip (with transmittance greater than 0.999995) centered at 0.532 microns. Therefore, except for the narrow s-polarization reflection band around 0.532 microns, this beamsplitter is highly transmissive to incident light.

A second embodiment of the invention is useful when the lowest achievable refractive index of the rugate filter is greater than the refractive index of the embedding medium. In this embodiment, the p-polarization reflection can be suppressed by applying Brewster's condition for a high-low quarterwave stack, such that $$\tan\theta_L = \frac{n_H}{n_L}.$$

The angle of propagation ($\theta_L$) in a rugate filter is related to the angle in the incident medium ($\theta_i$) by Snell's law:

$n_i \sin\theta_i = n_L \sin\theta_L$.

The combination of these conditions yields an incidence angle in the incident medium that suppresses the p-polarization reflection. For a rugate filter, the high and low excursions of the index of refraction may be expressed as:

$n_H = n_{average} + \frac{1}{2}(n_{peak-to-valley})$, and $n_L = n_{average} - \frac{1}{2}(n_{peak-to-valley})$.

Therefore, the incidence angle in the embedding medium of a polarizing beamsplitter at the rugate filter interface may be expressed as:

$$\theta_i = \arcsin\left[\left(\frac{n_L}{n_i}\right)\sin\left\{\arctan\left(\frac{n_H}{n_L}\right)\right\}\right].$$

Figure 6:
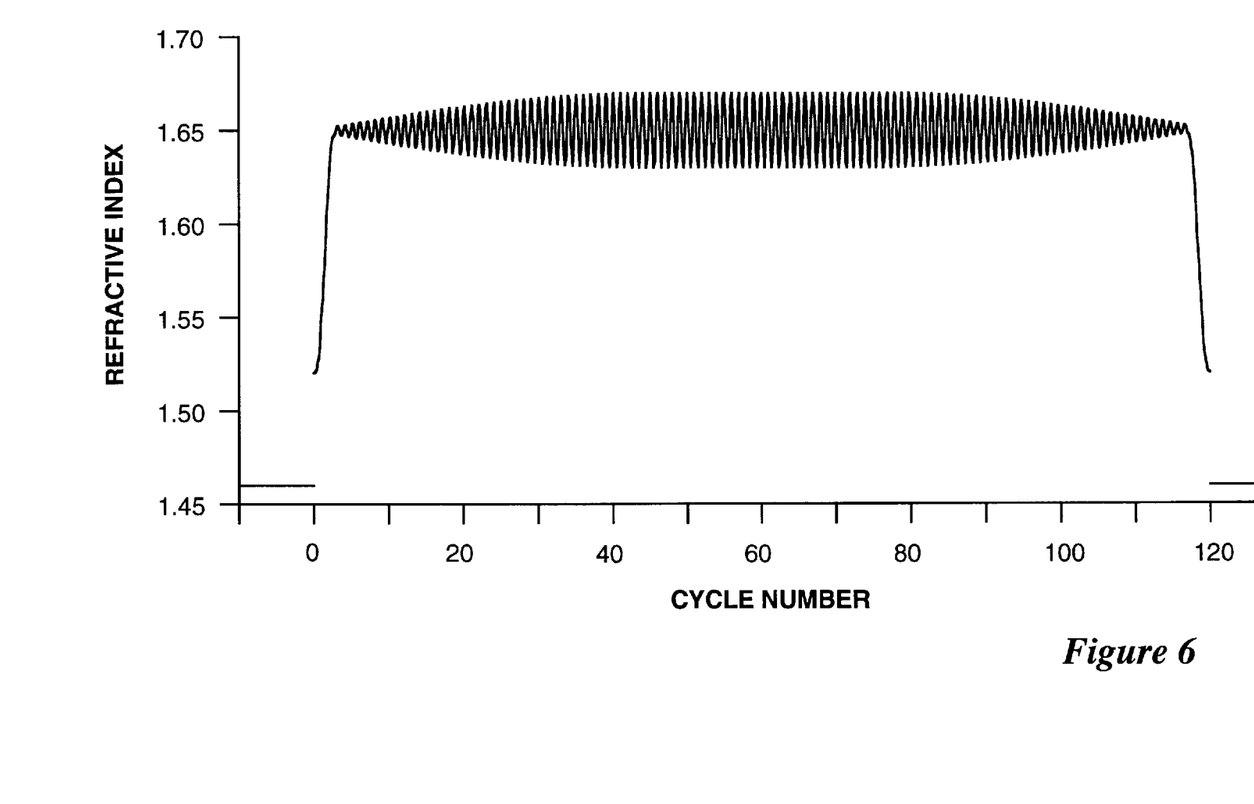
FIG. 6 is a graph of the refractive index profile of a rugate filter having an average refractive index that is greater than that of the media in which it is embedded.

An exemplary refractive index profile for a rugate filter of this embodiment of a polarizing beamsplitter is illustrated in FIG. 6. This rugate filter (as an example) has 120.5 cycles with a maximum peak-to-valley refractive index excursion of 0.04. The entire refractive index profile of this rugate filter is greater than the refractive index of the embedding medium (1.46 for fused silica prisms, for example). As in the first embodiment described above, this rugate filter is apodized by a half cycle sine-wave enveloping function to enhance the internal transmittance of the optic. In this case, however, apodization is applied only to the initial and final 45.25 cycles of the rugate filter, so that the middle 30 cycles are not apodized. A quintic function (see U.S. Pat. No. 4,583,822) is applied to terminate the ends of the rugate filter at a refractive index of 1.52. The quintic function is used to minimize the refractive index discontinuity between the rugate filter and embedding medium.

Figures 4, 5:
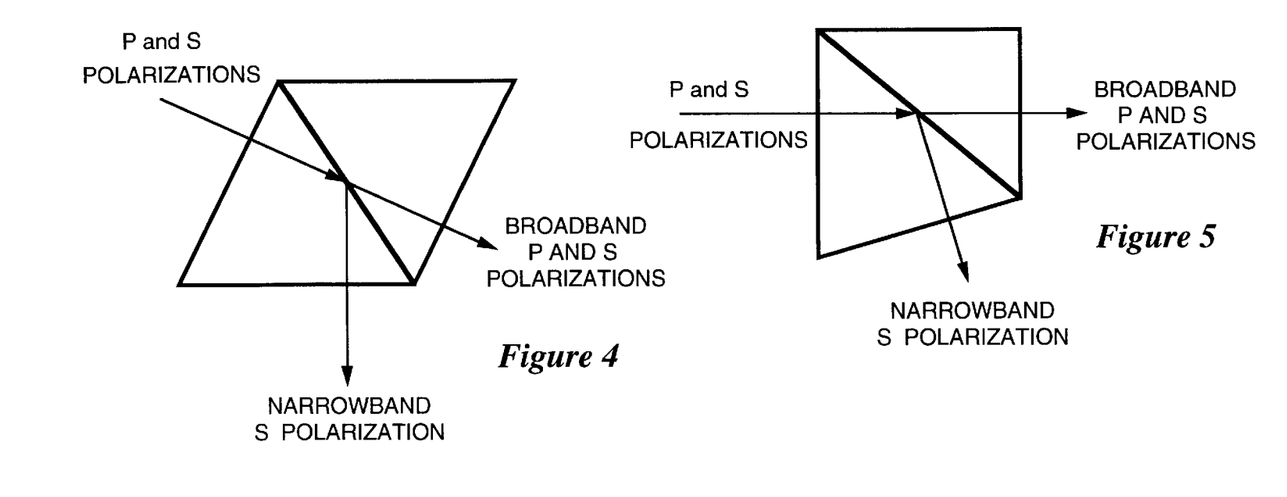
FIG. 4 is a top plan view of prisms joined in the form of a parallelepiped with an embedded rugate filter.
FIG. 5 is a top plan view of prisms joined in a trapezoidal form with an embedded rugate filter.

Applying the equation immediately above to the rugate filter illustrated in FIG. 6 gives an optimum incidence angle ($\theta_i$) of 53.0°. Therefore, light within the embedding medium should travel at an incidence angle of 53.0° with respect to a normal to the interface with the rugate filter. The resulting beamsplitting optic may be shaped as a parallelepiped or trapezoidal polarizing beamsplitter, as illustrated in the top plan views of FIGS. 4 and 5, respectively. The incident and exiting beams of light (illustrated by the arrows in FIGS. 4 and 5) are normal to the external faces of the polarizing beamsplitters.

Figure 7:
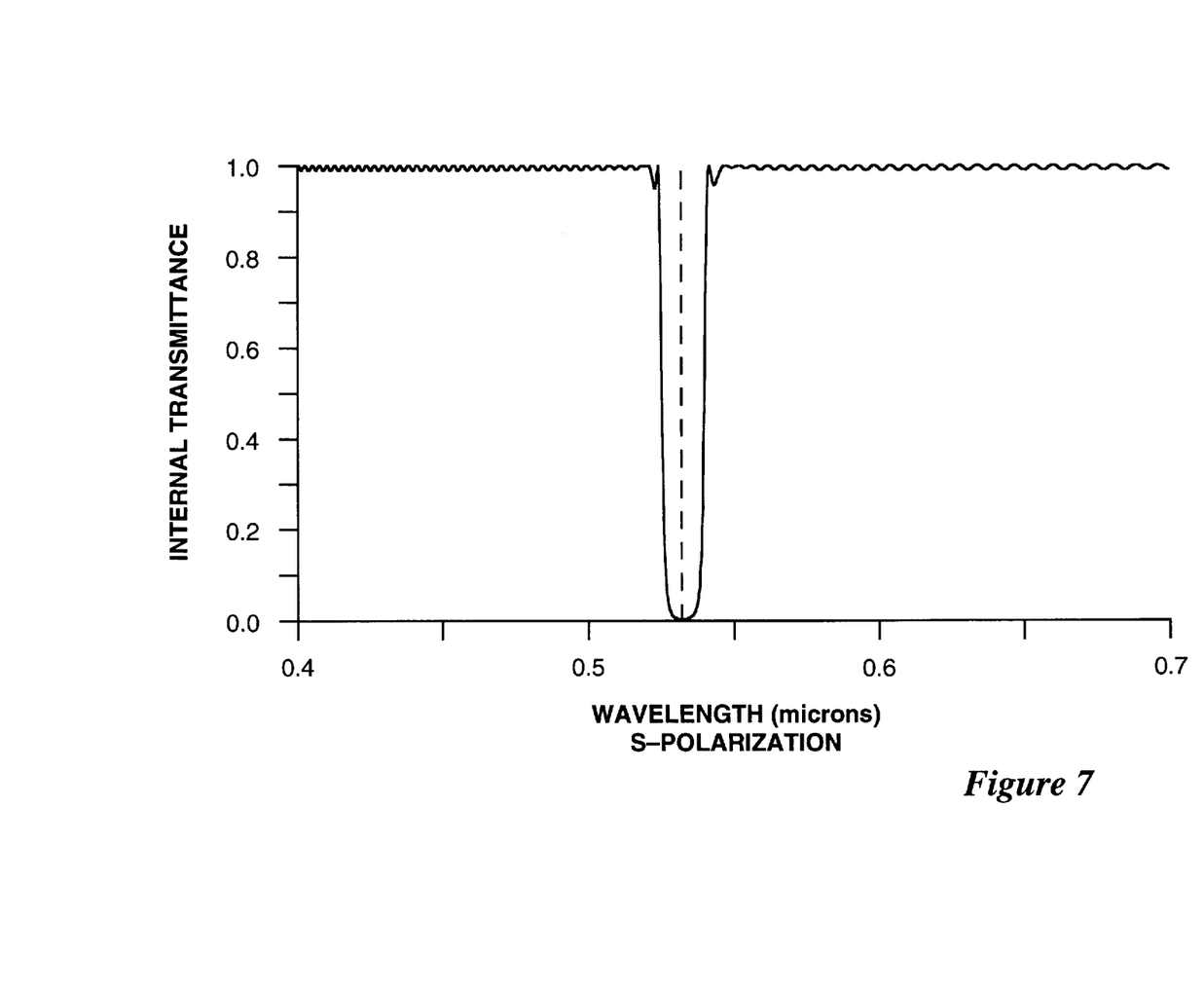
FIG. 7 is a graph of the s-polarization internal transmittance of a polarizing beamsplitter having an embedded rugate filter with the refractive index profile illustrated in FIG. 6.

The embodiment illustrated in FIG. 6, like the first embodiment illustrated in FIG. 1, is designed to produce a highly transmitting polarizing beamsplitter having a single s-polarization reflection band at 0.532 microns. The s-polarization transmittance of this embodiment is illustrated in FIG. 7. The dashed vertical line again indicates the 0.532 micron laser wavelength of interest. The reflection band for this embodiment has a full-width-half-maximum bandwidth of approximately 1.0 percent centered around the 0.532 micron wavelength. The bandwidth of the reflection band has been narrowed (compared with that of the first embodiment illustrated in FIG. 2) by decreasing the peak-to-valley excursion in the sine wave refractive index profile (FIG. 6). As in the first embodiment (see FIG. 2), the sidelobes adjacent to the s-polarization reflection band are the most predominate, but FIG. 7 also shows numerous sidelobes having very small internal transmittance variations. However, nearly all of the s-polarization internal transmittance is greater than 0.99. The internal transmittance for p-polarized light also has numerous small variations (not illustrated), but all p-polarization transmittance values are greater than 0.999.

Figure 8:
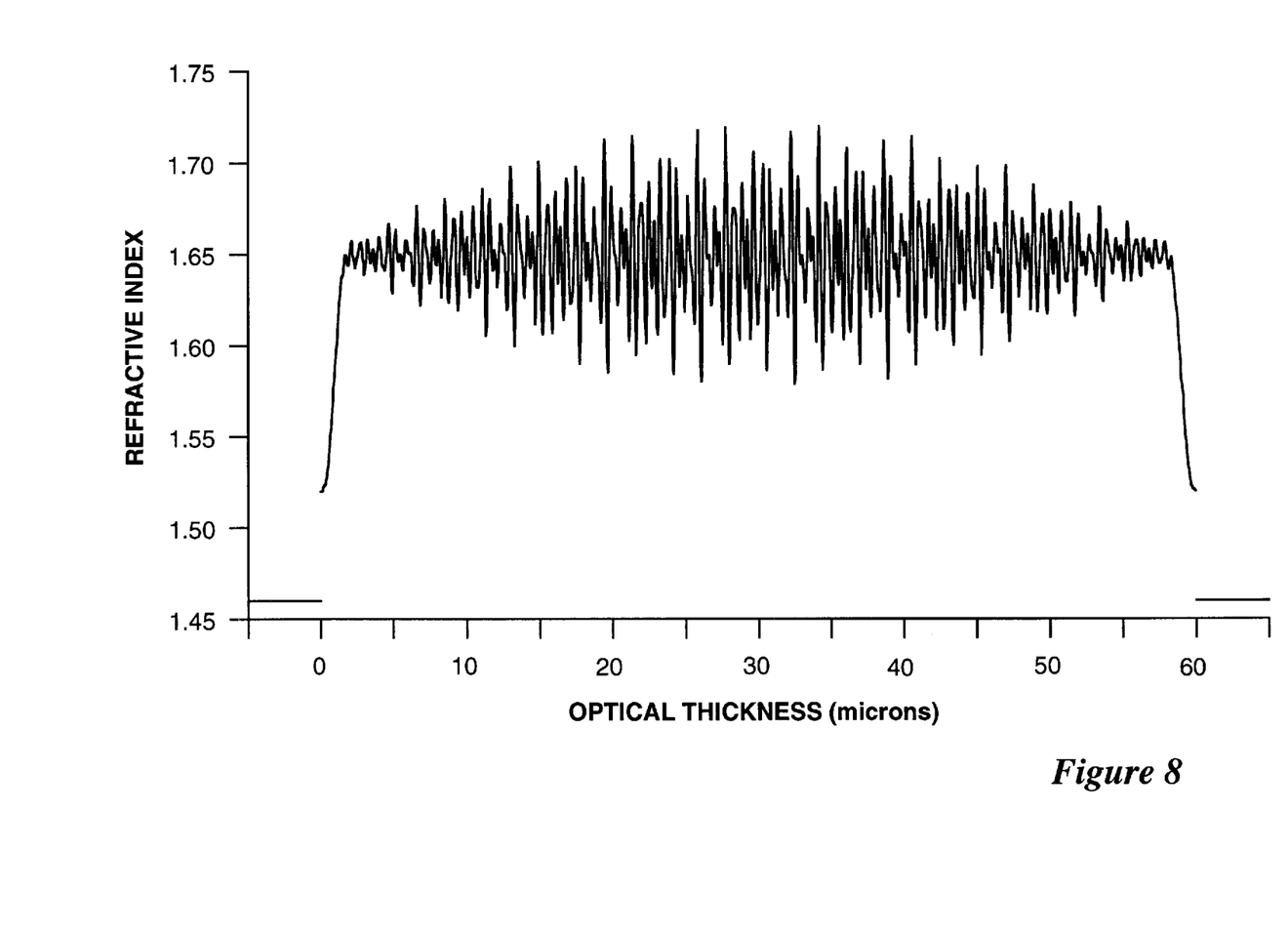
FIG. 8 is a graph of the refractive index profile of a rugate filter having three superimposed sinusoidal profiles and an average refractive index that is greater than that of the media in which it is embedded.

Whether the average refractive index of the rugate filter is matched to the embedding medium (as in FIG. 1) or not (as in FIG. 6), various sine wave refractive index variations with differing periods can be superimposed to obtain multiple s-polarization reflection bands. For example, FIG. 8 illustrates a refractive index profile for a rugate filter having an average refractive index of 1.65 (which is higher than the refractive index of the embedding medium (1.46 in this example), as described above in conjunction with the embodiment of FIG. 6). The profile of FIG. 8 results from the superposition of three sine waves, with peak-to-valley refractive index excursions of 0.06, 0.045, and 0.045, respectively. Therefore, the maximum and minimum refractive indices possible for this filter are 1.725 and 1.575, respectively (i.e., 1.65±½ (0.06+0.045+0.045)). Using these values in the incidence angle equation above yields an incidence angle ($\theta_i$) within the embedding medium of 52.81° from the normal to the rugate filter interface. The superposition of the three sine waves may fall short in the thousandth's place of obtaining the maximum of 1.725 and minimum of 1.575, which may affect the incidence angle ($\theta_i$) in the hundredths place. However, the effect on the resulting s- or p-polarization spectral performance is negligible.

The refractive index profile illustrated in FIG. 8 also utilizes a sinusoidal apodization envelope and a quintic matching between the average refractive index of the filter and the refractive index of the embedding medium. The resulting refractive index profile undergoes refractive index variations in amplitude and rate that can be large and rapid or small and slow.

Figure 9:
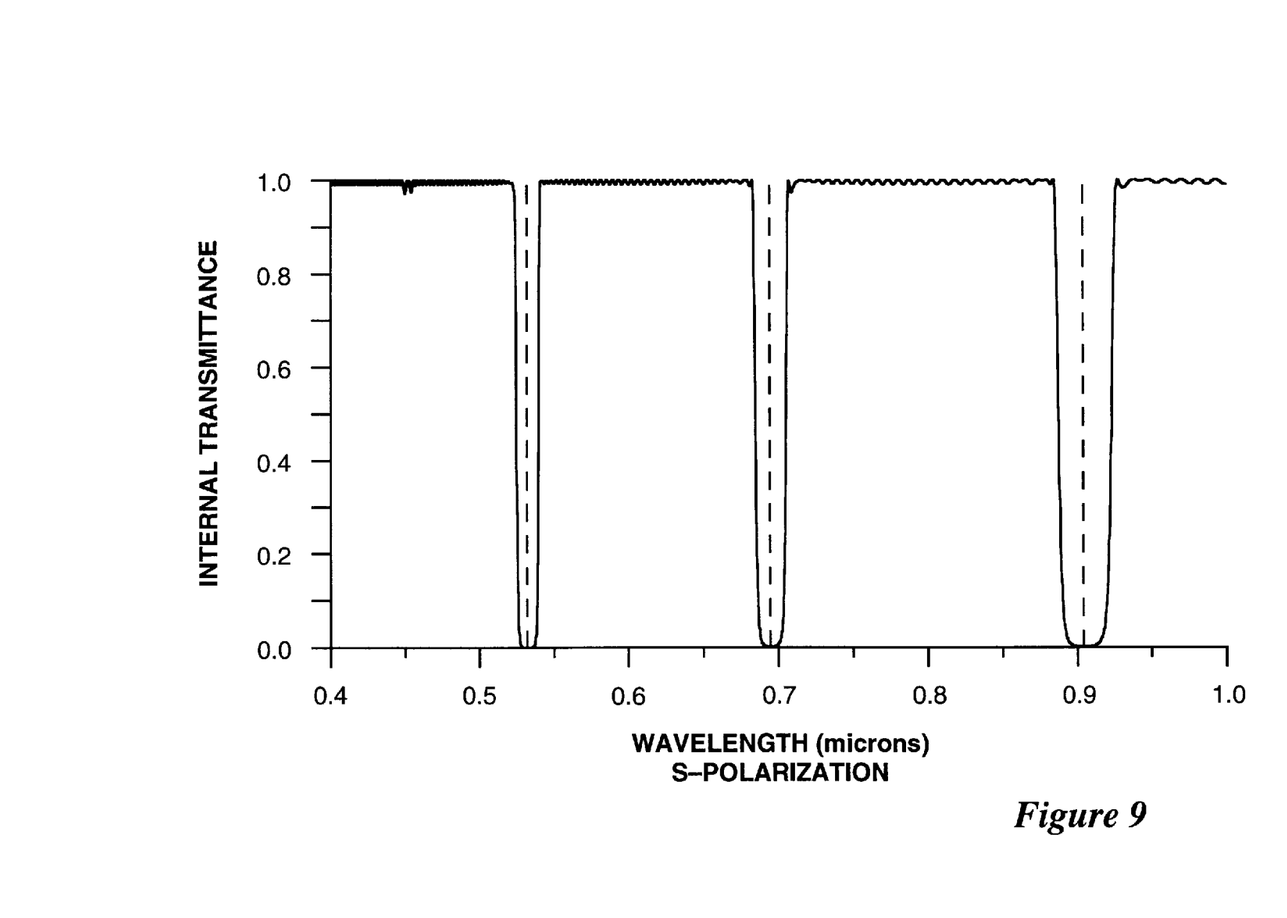
FIG. 9 is a graph of the s-polarization internal transmittance of a polarizing beamsplitter having an embedded rugate filter with the refractive index profile illustrated in FIG. 8.

The rugate filter illustrated in FIG. 8 is designed to produce three s-polarization reflectance bands located at 0.532, 0.694, and 0.904 microns, respectively, as illustrated in FIG. 9. These three wavelengths, which correspond to the output of a double Neodymium YAG laser, a ruby laser, and a gallium arsenide diode laser, are identified by dashed vertical lines in FIG. 9. The diode laser wavelength (0.904 microns) is found in range finders used by sailing crews and radar guns used by law enforcement agencies. The three s-polarization reflection bands have full-width-half-maximum bandwidths of 2.8, 3.0, and 4.0 percent, respectively. FIG. 9 also shows small sidelobes adjacent to the s-polarization reflection bands and at about 0.452 microns, which is the second harmonic of the diode laser wavelength at 0.904 microns. However, the internal transmittance for s-polarized light outside of the three reflection bands is generally greater than 0.99. The internal transmittance for p-polarized light is generally greater than 0.999, with only two small sidelobes (having transmittance greater than 0.997) at about 0.452 microns (not illustrated).

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A polarizing beamsplitter comprising:
   an optical medium; and
   a rugate filter embedded in said optical medium at a non-orthogonal angle with respect to an incident beam in said optical medium, said angle being defined by $$\theta_i = \arcsin\left[\left(\frac{n_L}{n_i}\right)\sin\left\{\arctan\left(\frac{n_H}{n_L}\right)\right\}\right],$$

where $\theta_i$ is the angle of incidence of said incident beam with respect to a normal to said rugate filter, $n_i$ is the refractive index of said optical medium, and $n_H$ and $n_L$ are high and low values, respectively, of the refractive index profile of said rugate filter.

2. The polarizing beamsplitter of claim 1, wherein said embedded rugate filter transmits broadband portions of said incident beam and reflects an s-polarized narrow wavelength portion of said incident beam.

3. The polarizing beamsplitter of claim 1, wherein said optical medium comprises a pair of prisms joined on facing sides with said rugate filter disposed between said joined sides of said prisms.

4. The polarizing beamsplitter of claim 1, wherein said embedded rugate filter transmits broadband portions of said incident beam and reflects a plurality of s-polarized narrow wavelength portions of said incident beam.

5. A polarizing beamsplitter, comprising:
   a pair of prisms joined on facing sides to form an optical medium for an incident beam; and
   a rugate filter disposed between said joined sides of said prisms;
   said incident beam having an incident angle in said optical medium with respect to a normal to said rugate filter such that said incident angle is defined by $$\theta_i = \arcsin\left[\left(\frac{n_L}{n_i}\right)\sin\left\{\arctan\left(\frac{n_H}{n_L}\right)\right\}\right],$$

where $\theta_i$ is the angle of incidence of said incident beam with respect to said normal to said rugate filter, $n_i$ is the refractive index of said optical medium, and $n_H$ and $n_L$ are high and low values, respectively, of the refractive index profile of said rugate filter.

6. The polarizing beamsplitter of claim 5, wherein said rugate filter disposed between said prisms transmits broadband portions of said incident beam and reflects an s-polarized narrow wavelength portion of said incident beam.

7. The polarizing beamsplitter of claim 5, wherein said rugate filter disposed between said prisms transmits broadband portions of said incident beam and reflects a plurality of s-polarized narrow wavelength portions of said incident beam.

* * * * *